(12) United States Patent
Urrutia et al.

(10) Patent No.: US 6,416,025 B1
(45) Date of Patent: Jul. 9, 2002

(54) PART RETAINER

(75) Inventors: Alvaro Eduardo Urrutia, Ann Arbor; Gregory Paul Thomas, Dearborn, both of MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 09/621,918

(22) Filed: Jul. 24, 2000

(51) Int. Cl.⁷ .............................................. A47B 96/00
(52) U.S. Cl. ............................ 248/224.61; 248/221.11; 248/297.21; 248/419
(58) Field of Search .................................. 248/419, 429, 248/420, 423, 27.1, 27.3, 221.11, 222.13, 224.61, 298.1, 300, 297.21, 222.12; 224/321, 325

(56) References Cited

U.S. PATENT DOCUMENTS

| | | | | |
|---|---|---|---|---|
| 4,224,974 A | * | 9/1980 | Anderson et al. ... | 248/222.12 X |
| 4,406,386 A | * | 9/1983 | Rasor et al. ........ | 248/297.21 X |
| 5,370,284 A | * | 12/1994 | Dirksing ............... | 222/534 |
| 5,560,572 A | * | 10/1996 | Osborn et al. ......... | 248/27.3 |
| 5,664,755 A | * | 9/1997 | Gruber ................. | 248/424 |
| 5,738,327 A | * | 4/1998 | Tanaka et al. ........ | 248/419 |
| 5,740,999 A | * | 4/1998 | Yamada ................ | 248/429 |
| 6,158,699 A | * | 12/2000 | Boe ..................... | 248/27.1 |
| 6,203,366 B1 | * | 3/2001 | Muller et al. ......... | 248/27.3 X |
| 6,213,296 B1 | * | 4/2001 | Streich et al. ......... | 206/373 |

FOREIGN PATENT DOCUMENTS

| | | |
|---|---|---|
| JP | 63117619 | 7/1988 |
| JP | 3-55331 | 5/1991 |
| JP | 4-123739 | 11/1992 |

* cited by examiner

*Primary Examiner*—Leslie A. Braun
*Assistant Examiner*—Tan Le
(74) *Attorney, Agent, or Firm*—Gifford, Krass, Groh, Sprinkle, Anderson & Citkowski, P.C.

(57) ABSTRACT

A part retention system for mating parts comprises a pair of flexible guide ribs, integrated into a cap which is to be attached or interlocked. Each of the guide ribs incorporates one or more detents, which force the guide ribs apart as a tab on the mating component moves along the detents. The guide ribs having angled locating portions to direct the guide ribs over the tab to facilitate blind installation.

15 Claims, 4 Drawing Sheets

PART RETAINER

FIELD OF THE INVENTION

This invention relates generally to systems for interlocking two parts, and more specifically, it relates to a part retention system for easily locating and affixing an end cap to a bracket of a slidably adjustable seat position adjuster.

BACKGROUND OF THE INVENTION

Retaining systems for interlocking mating parts of an assembly play an important role in the manufacture of many everyday items. Such systems are utilized in a wide variety of applications. Many industries, particularly the automotive industry, employ retaining systems to interlock parts of an assembly, secure ancillary components to a larger assembly, and add decorative or trim pieces to various more functional components.

For example, automotive manufacturers often add trim pieces to cover a seat adjuster mounting bracket and bolt. The trim cover enhances the overall appearance of the seat adjuster track, and also covers up any damaging sharp edges or protrusions of the bracket and/or attaching bolt.

Many types of retaining systems are known and disclosed in the prior art. For example, Japanese Patent 3-55331 discloses a retaining system including locking detents which are attached to a non-visible side of a cover. This type of arrangement exhibits two inherent drawbacks: a) unsightly sink marks can appear on the visible surface of a molded part due to the abundance of material concentrated in one area, and b) tolerances must be tightly controlled to maintain appearance and proper fit between the parts.

A retaining system disclosed in Japanese Patent 4-123739 utilizes detents formed on flexible ribs to lock to both sides of a tab. However, the locking tab has a triangular cross-section with a complex shape and the flexible ribs are connected at their ends. Product of this structure requires a complex manufacturing process. A retaining system which incorporates a dual detent locking device is disclosed in Japanese Patent 63-117619. This system requires a mating part having a cut out or separately inserted portion to interlock with a part incorporating the dual detents.

Thus, it would be desirable to provide a retaining system which minimizes the tolerance precision and the amount of material concentrated behind the visible surfaces of molded parts, resulting in cost savings per part. It would also be desirable to provide a retaining system which permits easy installation for areas of low clearance and which is self-locating.

BRIEF SUMMARY OF THE INVENTION

The present invention is directed to a part retainer system for attaching an ancillary part to a component or part of an assembly. The part retainer includes a cap having a pair of flexible guide ribs formed on the inner surface of the cap. Detents extend from the guide ribs to engage a tab formed on the component to which the cap is attached. The guide ribs are deformable. At installation, the guide ribs slide along the tab to permit the detents to pass over the tab. Once the tab passes the detents, the ribs flex toward each other, such that the detents lock the tab in place, resulting in the secure attachment or interlocking of the components.

The present invention alleviates the concern for critical tolerance control, through application of flexible ribs which, by their nature, do not require the strict tolerances of the prior art in order to achieve the same objective. These ribs extend normally along the non-visible surface of the cap, allowing the detents, and their inherent high mass concentration, to be spaced away from the visible appearance-tuned surface. This arrangement reduces the potential in molded parts for unsightly sink marks. Moreover, the need for tight tolerances in the present invention is reduced because an imprecise fit between the guide ribs and locking tab on the mating part would be accommodated by a greater variable spacing between the flexible ribs.

The present invention combines all of the aforementioned advantages while bypassing the difficulties. The present invention incorporates self-locating features, secure retention, and efficient manufacture in a low-cost fashion by integrating the retention system directly into the attached or interlocked parts. The result is a retaining system with reduced costs, both in the manufacture and assembly of the interlocked parts.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. It should be understood, however, that the invention is not limited to the precise arrangement and instrumentalities shown. In the drawings.

DETAILED DESCRIPTION OF THE INVENTION

Figure 1:
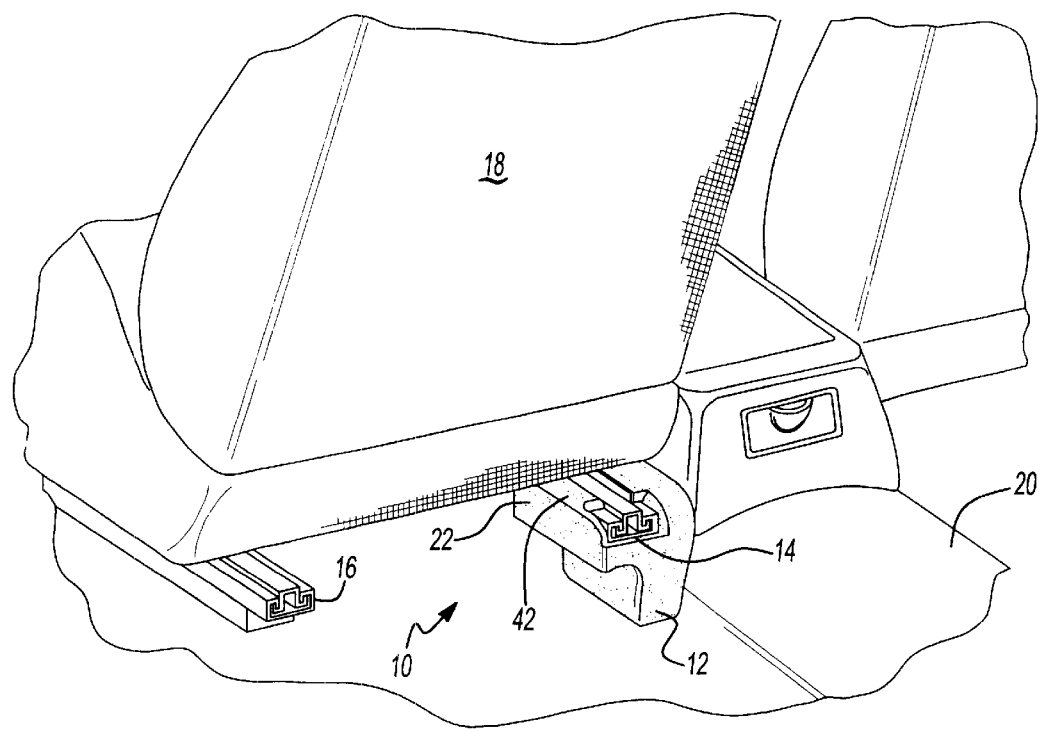
FIG. 1 is a perspective view of an automotive seat adjuster bracket end cap mounted in a vehicle in accordance with the invention.
Figure 7:
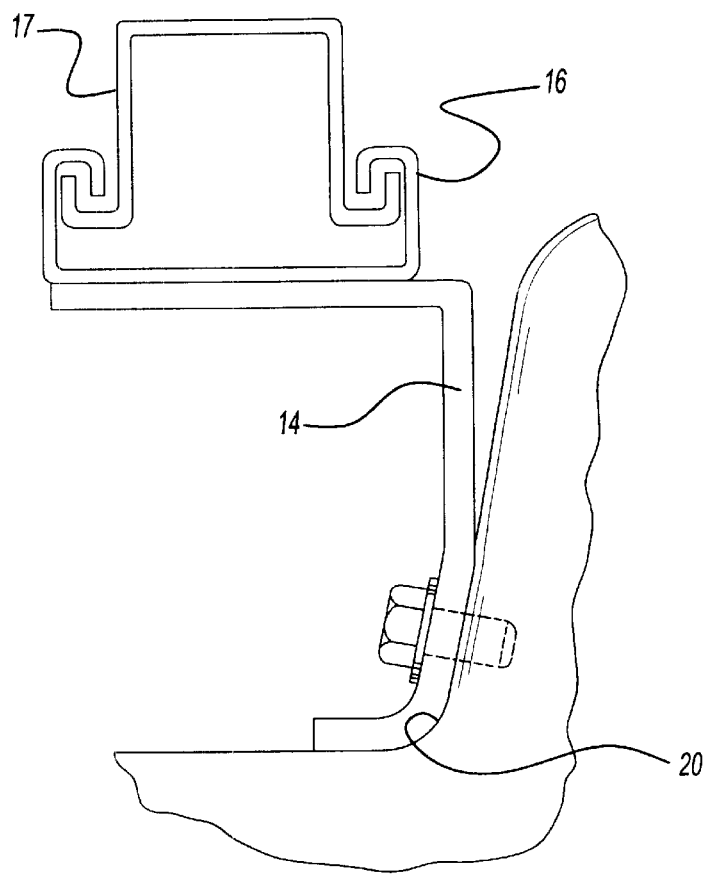
FIG. 7 is a section view of a bracket supporting a lower rail of a seat adjuster.
Figure 8:
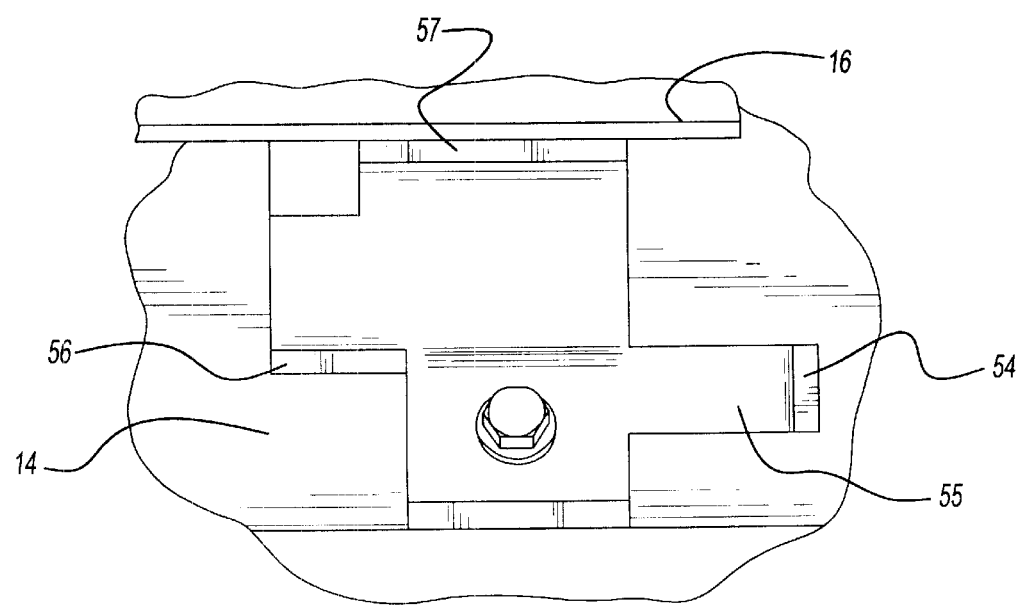
FIG. 8 is a perspective view of the bracket in accordance with the invention.

A part retaining system 10 for attaching a cap 12 to a structure is shown in FIG. 1. The preferred embodiment of the retaining system 10 is shown for attaching the cap 12 to a bracket 14 supporting a lower rail 16 of a seat adjuster mechanism of a vehicle (FIGS. 7, 8). An upper rail 17 is mounted beneath a seat 18 to selectively slide within the lower rail 16 (FIG. 4).

As shown in FIG. 1, the cap 12 is mounted to the bracket 14 (shown in FIGS. 7 and 8) which is bolted to a transmission tunnel 20. The retaining system 10, however, can be used to mount caps in other positions or arrangements, such as to a bracket which is mounted to the floor. As shown in FIG. 8, the bracket 14 is formed of metal and has a tab 54 and a bracket extension portion 56 adapted to engage the cap 12. The tab 54 extends from an arm 55 extending beneath a transverse portion 57 of the bracket which supports the lower rail 16 of the seat adjustment mechanism.

Figure 4:
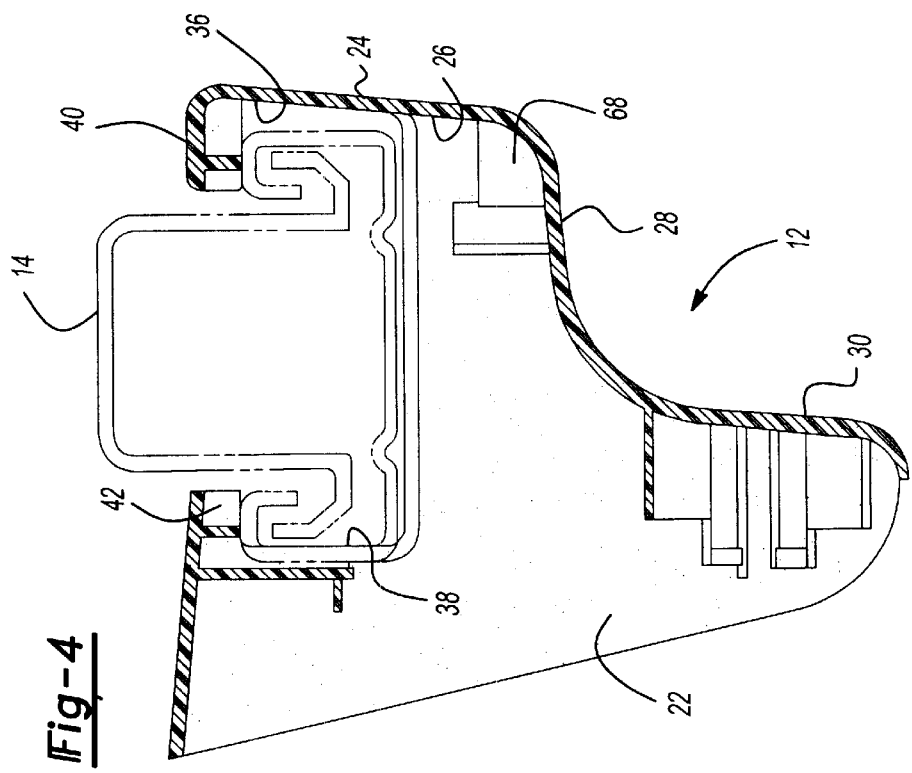
FIG. 4 is an elevational view of the inside of the end cap piece as engaged with the automotive seat adjuster rail in accordance with the invention.

As shown in FIGS. 2–5, the cap 12 is unitarily formed of a suitable moldable material such as thermoplastic. The cap 12 has an end wall 22 and a side wall 24 which are formed in a generally L-shape. The side wall 24 extends parallel with the transmission tunnel 20 beneath the seat 18. The side wall 24 has an upper wall portion 26 extending downwardly to an intermediate wall 28 which extends horizontally beneath the lower track 16 to a vertically extending lower wall portion 30. An open channel 32 is formed to extend inwardly from the end wall 22 to freely receive the rail 17. The channel 32 is formed by a transverse lower wall 34 extending between an inner surface 36 of the side wall 24 and a vertical wall 38. A flange 40 extends from the side wall 24 towards a flange 41 extending from the vertical wall 38 to extend partially over the rails 16, 17 as shown in FIG. 4.

Figure 3:
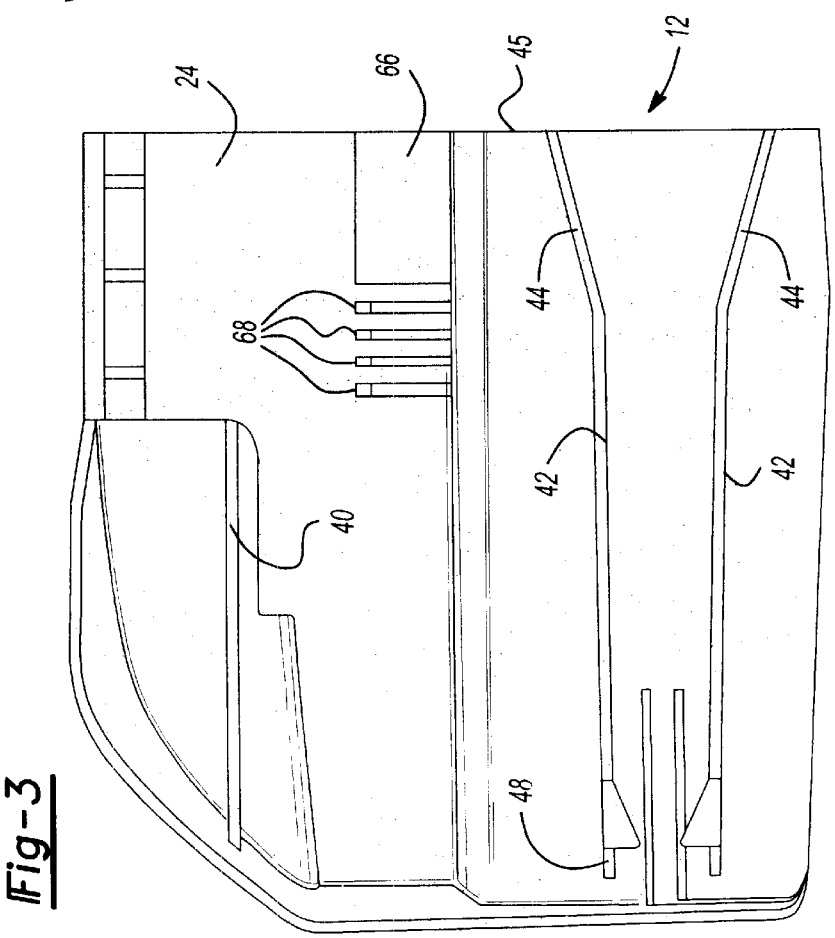
FIG. 3 is an elevational view of the inside of the end cap in accordance with invention.
Figure 5:
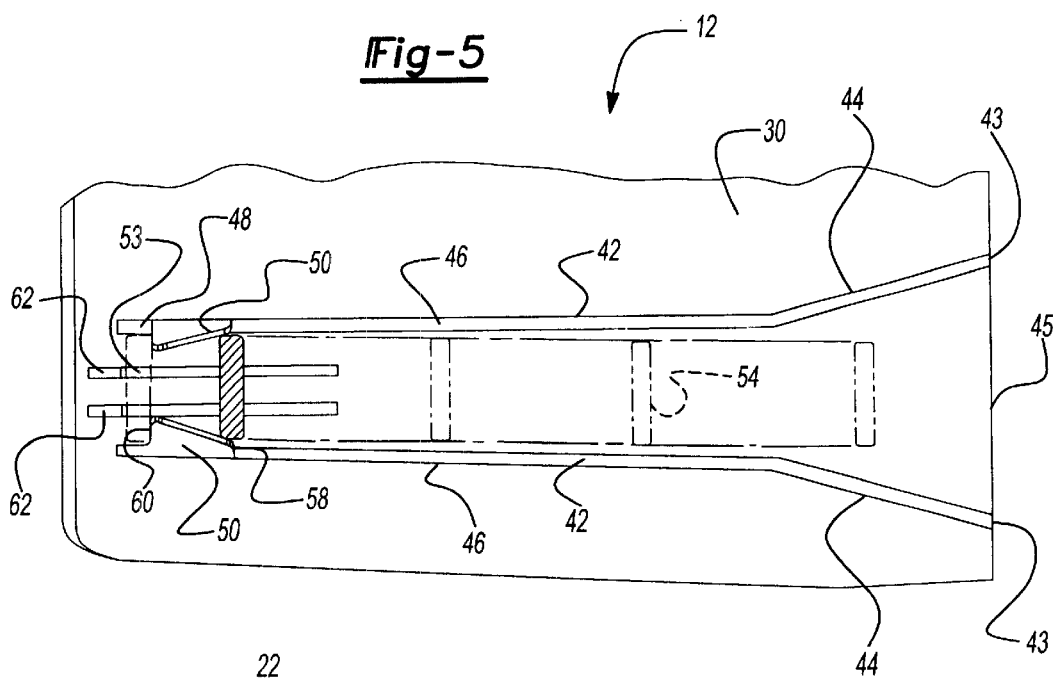
FIG. 5 is a partial side view of the inside of the end cap in accordance with the invention.

As shown in FIG. 3, a pair of guide ribs is formed on the inner surface of the lower wall portion 30 to guide the cap 12 on the tab 54 during installation. Each guide rib 52 extends from the wall portion 30 to an edge 70. Each guide rib 42 extends from an outer end 45 extending from a front edge 47 of the cap 12 to an inner end 48 which is spaced apart from the end wall 22. The spacing of the inner end 48 away from the side wall 22 permits ready deformation of the guide ribs 42 as the tab 54 passes between a pair of detents 50 located adjacent the inner ends 48 of the guide ribs 42. Each guide rib 42 has a locating portion 44 extending from the outer edge 45 to an intermediate portion 46. The locating portions 44 converge towards each other from the angle of 25° to 35° to receive and direct the tab 54 of the bracket 14 into the space formed by the intermediate portions 46 of the guide ribs 42. The intermediate portions 46 converge slightly from the locating portions 44 to the width of the tab 54 at the detents 50.

Figure 6:
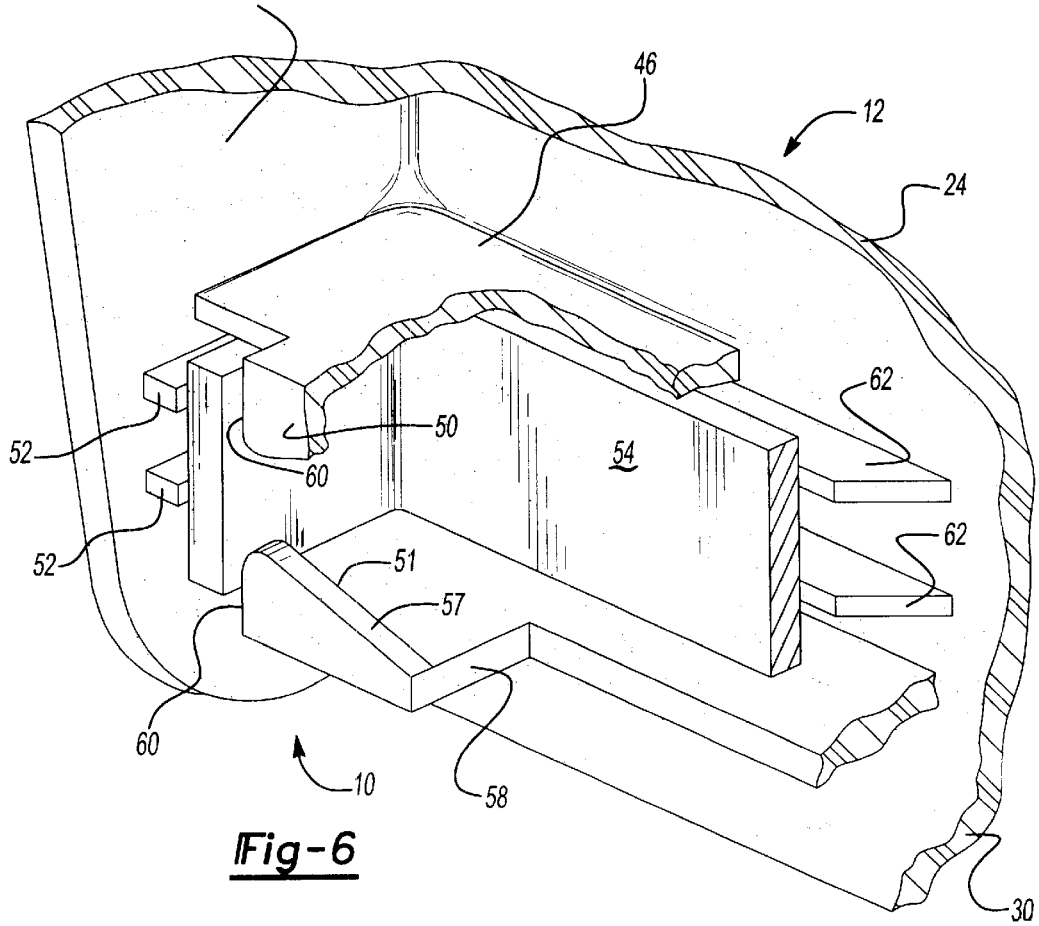
FIG. 6 is a partial perspective view of the end cap with detents engaging the bracket.

As shown in FIGS. 3–6, each detent 50 has a ramp 57 which angles outwardly from a front edge 58 towards a rear edge 60. As shown in FIG. 6, a pair of L-shaped fingers 52 are positioned between the guide ribs 42 and extend outwardly from the inner surface of the end wall 22 and side wall 30. Each finger 52 has an edge 53 which is spaced from the rear edge 60 of the detent a distance "d" generally equal to a thickness "t" of the tab 54 (FIG. 6). The edges 53, 60 thus hold the tab 54 securely.

Figure 2:
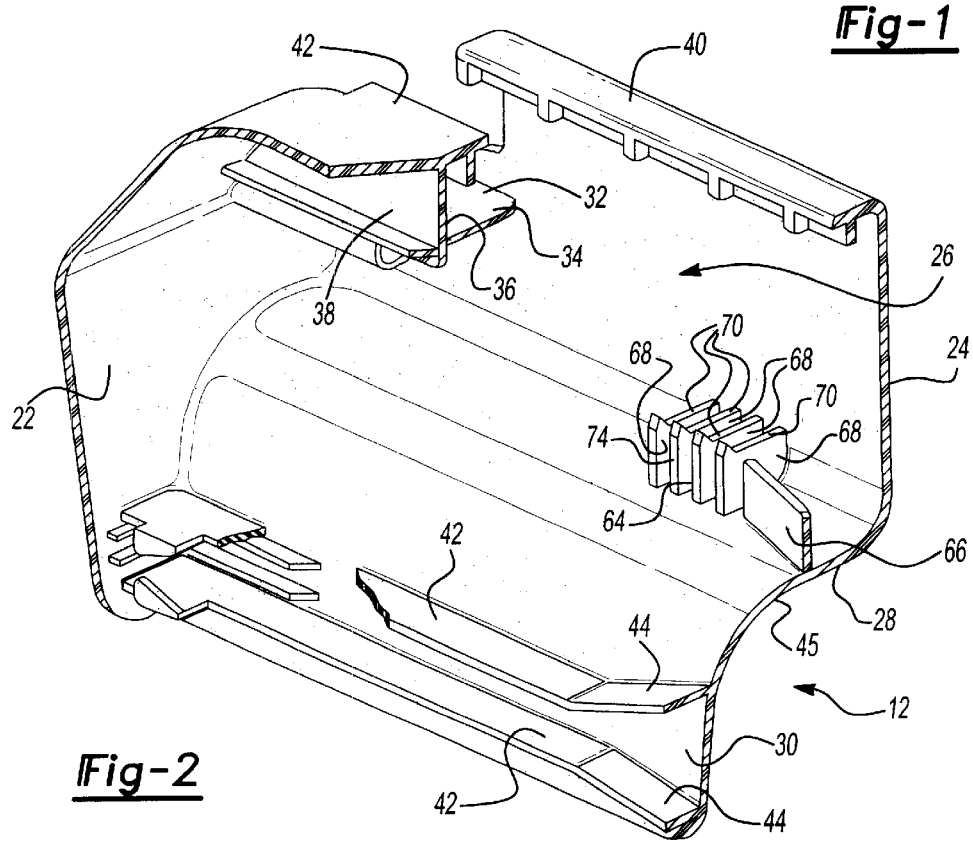
FIG. 2 is a perspective view of the backside of the end cap in accordance with the invention.

As shown in FIG. 2, a secondary positioning mechanism 64 is formed on the inner surface 34 of the intermediate wall portion 28 and inner surface of the upper wall portion 26 of side wall 24. The secondary positioning mechanism 64 includes a guide wall 66 and four spaced apart support walls 68. The guide wall 66 extends upwardly from the intermediate wall portion 28 and is angled inwardly from the front edge 47 towards the upper portion 26 of the side wall 24. The support walls 68 are spaced apart parallel and extend upwardly from the intermediate portion transversely to the longitudinal axis of the guide ribs 42. The support walls 68 have flat upper surfaces 70 spaced inwardly from arms 72 formed on outer edges 74 of the support walls. The guide wall 66 centers and guides cap 12 over the bracket extension portion 56. The arms 72 abut the bracket extension 56 to hold the cap 12 in the transverse direction.

INSTALLATION

The cap 12 is positioned with the front edge 47 adjacent the bracket 14 with the tab 54 between the locator portions 44 of the guide ribs 42 and the bracket extension portion 56 abutting the guide surface 66.

The guide ribs 42 and guide wall 66, as well as the flanges 40, 41 and surfaces of the U-shaped channel guide the cap as it is slid toward the front of the vehicle. The tab 54 engages the ramps of detents 50 and displaces the detents and guide ribs outwardly until the detents 50 snap inwardly after the tab 54 passes the rear edge 60 of the detent to fix the tab 54 in position. The snap permits the installer to know the cap 12 is in position. Because the inner ends 48 of the guide ribs 42 are free and not attached, the ribs 42 deform to permit easy passage of the tab 54 through the detents 50. At the same time, the secondary positioning mechanism 64 is aligning the cap 12. After installation, the arms 72 of the support walls 68 hold the cap 12 from transverse dislocation from the bracket 14. Thus, the cap 12 is easily installed. The guide ribs 42 and guide wall 66 center the cap 12 during installation and together with the snap permit a "blind" assembly which is easily accomplished.

The retaining system 10 of the present invention securely retains the cap 12 in position when subjected to external forces, such as cleaning instruments and movement from passenger's feet. Thus is provided a cap with a retaining system that may be easily installed and inexpensively manufactured.

The discussion and examples hereinabove represent a specific embodiment of applications of the present invention. Within the guidelines given herein, one of skill in the art could readily recognize variations of the invention. Therefore, it is to be understood that the foregoing discussion, description and example are illustrative of a particular embodiment of the present invention but are not meant to be limitations upon the practice thereof. It is the following claims, including all equivalents, which define the scope of the invention.

We claim:

1. An end cap for lockably engaging a bracket, said bracket having a tab projecting therefrom, said cap comprising:

an end wall and a side wall, said end wall extending from one end of said side wall, an opposite end of said side wall having a side edge;

a pair of spaced apart flexible guide ribs, each of said pair of guide ribs extending outwardly from said side wall to an outer edge, each rib having an inner end spaced apart from said end wall and an outer end adjacent said side edge of said side wall, each of said pair of ribs having a locating portion converging from said outer end towards an opposite one of said pair of guide ribs forming a V-shaped opening;

at least one detent disposed on said outer edge of each of said guide ribs on said inner end, said at least one detent adapted to engage said tab of the bracket, said guide ribs adapted to slide along said tab and engage said tab between said at least one detent and said end wall.

2. The end cap of claim 1 wherein said cap further comprises an end wall, said inner end being spaced apart from said end wall.

3. The end cap of claim 2, wherein said at least one detent is spaced apart from a locating finger on said side wall to define a locking space between a rear edge of said detent and said locating finger to capture said tab.

4. The end cap of claim 1, wherein said end cap is formed from a polymeric material.

5. The end cap of claim 2 wherein said at least one locating finger extends from said end wall.

6. The end cap of claim 1 further comprising a positioning mechanism having a guide rail spaced apart from said pair of guide ribs on said side wall and being adapted to engage said bracket.

7. The end cap of claim 6 wherein said positioning mechanism includes a plurality of spaced apart support walls adjacent said guide rail.

8. A parts retention system, said system comprising:
   a tab extending from a bracket;
   an end cap for lockably engaging said tab, said end cap having an inner surface, said end cap also having a first and a second guide rib extending from said inner surface, said guide ribs being formed from a resilient material;
   a detent disposed on each of said guide ribs, said detents extending toward each other, and adapted to engage said locking tab;
   a positioning portion having at least one planar member protruding from said end cap inner surface for engaging said bracket.

9. The part retention system of claim 8 wherein said bracket further comprises a bracket extension portion adapted to engage said positioning portion.

10. The part retainer system of claim 8 wherein each of said guide rails comprises an outer end and a free inner end.

11. The end cap of claim 8 wherein said cap further comprises an end wall, said free inner end being spaced apart from said end wall.

12. The end cap of claim 11, wherein said at least one detent is spaced apart from a locating finger on said side wall to define a locking space between a rear edge of said detent and said locating finger to capture said tab.

13. The end cap of claim 8, wherein said end cap is formed from a polymeric material.

14. The end cap of claim 11 wherein said at least one locating finger extends from said end wall.

15. The end cap of claim 8 wherein said positioning mechanism includes a plurality of spaced apart support walls adjacent said guide rail.

* * * * *

UNITED STATES PATENT AND TRADEMARK OFFICE
CERTIFICATE OF CORRECTION

PATENT NO.    : 6,416,025 B1
DATED         : July 9, 2002
INVENTOR(S)   : Alvaro Eduardo Urrutia It is certified that error appears in the above-identified patent and that said Letters Patent is hereby corrected as shown below:

Column 3,
Line 18, replace "52" with -- 42 --.

Signed and Sealed this

Fourteenth Day of January, 2003

JAMES E. ROGAN
*Director of the United States Patent and Trademark Office*